May 26, 1953 C. W. SAVITZ 2,639,781
ELECTROSTATIC FILTER
Filed Dec. 10, 1948 5 Sheets-Sheet 1

INVENTOR
CHRISTIAN W. SAVITZ
BY
Hyde, Meyer, Baldwin & Doran
ATTORNEYS

May 26, 1953

C. W. SAVITZ 2,639,781

ELECTROSTATIC FILTER

Filed Dec. 10, 1948

INVENTOR
CHRISTIAN W. SAVITZ

BY
Hyde, Meyer, Baldwin & Doran
ATTORNEYS

INVENTOR
CHRISTIAN W. SAVITZ
BY
Hyde, Meyer, Baldwin & Doran
ATTORNEYS

Patented May 26, 1953

2,639,781

UNITED STATES PATENT OFFICE 2,639,781

ELECTROSTATIC FILTER

Christian W. Savitz, South Euclid, Ohio, assignor to Air-Maze Corporation, Cleveland, Ohio, a corporation of Delaware Application December 10, 1948, Serial No. 64,642

23 Claims. (Cl. 183—7)

This invention relates to improvements in electrostatic filters.

One of the objects of the present invention is to provide an electrostatic filter cell which is self contained and readily moved into and out of a holding frame for inspection and cleaning.

Another object of the present invention is to provide a filter cell of the character described in the preceding paragraph of such dimensions and of such construction that it is readily assembled along side of or above and below other cells of a similar character so as to provide a plurality of cells in combination adapted to handle almost any predetermined volume of air or gas to be filtered.

Another object of the present invention is to provide a filter cell of electrostatic character which is of a simple but cheap and strong construction and adapted to efficiently carry out its purpose.

Still another object of the present invention is to provide an electrostatic filter cell comprising a set of parallel collector plates alternately charged with electrostatic charges of opposite sign with ionizing wires upstream therefrom and mounted in such a manner that the ionizing wires may be supplied with electric current through the charged collecting plates.

Another object of the present invention is to provide a pair of parallel ionizing wires spaced apart in the direction of gaseous stream flow and so arranged that the peak electrostatic field on the two wires are spaced apart at time intervals which are so coordinated with the rate of gas flow past the ionizing wires that a particle which fails to receive a charge while opposite one of the ionizing wires will almost certainly receive a charge when opposite the other wire.

Still another object of the present invention is to provide in combination ionizing wires for a gaseous stream with opposed electrodes of opposite sign and of parti-cylindrical form which provides a cheap construction but at the same time provides a maximum number of collector plates back of the parti-cylindrical shaped electrodes, the entire device being so arranged that the air flow past the parti-cylindrical electrodes is laminar which results in an even distribution of the gaseous stream over the collecting electrodes and an efficient collection of particles on those collector plates which lie down stream from the parti-cylindrical electrodes.

Another object of the present invention is to provide a self contained electrostatic filter cell adapted to be moved in and out of a holding frame in the manner of a drawer and wherein the high tension is supplied to the electrostatic cell only as it is pushed into its final position in the frame. This insures also that the high tension current is disconnected automatically upon removing the cell from the frame for inspection or cleaning.

Still another advantage of my invention is that it permits individual cells to be easily handled for quick inspection of the ionizing wires and for quick and easy cleaning of the collecting plates.

Still another object of the present invention is the provision of an electrostatic filter supplied by current from a power pack and in which the secondary high tension current from the power pack is smoothed or filtered in the electrical sense by using the collector plates of the filter cell as a capacitance.

Other advantages from my invention accrue from the arrangement and positioning of the parts whereby I am enabled to provide in a minimum of space for the efficient cleaning of a maximum volume of a gaseous stream.

Other objects and advantages of my invention will be apparent from the accompanying drawings and description and the essential features will be set forth in the appended claims.

I shall first describe my invention as applied to a single cell about four inches wide, twelve inches high and twenty-one and a half inches long. I will later describe how these cells may be assembled in larger units to take care of the necessary air flow. This single cell is designed to handle a gaseous stream such as air flowing at the rate of approximately three hundred feet per minute which is standard in the air conditioning industry at the present time. The capacity of this single cell therefore would be about one hundred cubic feet per minute.

Figure 5:
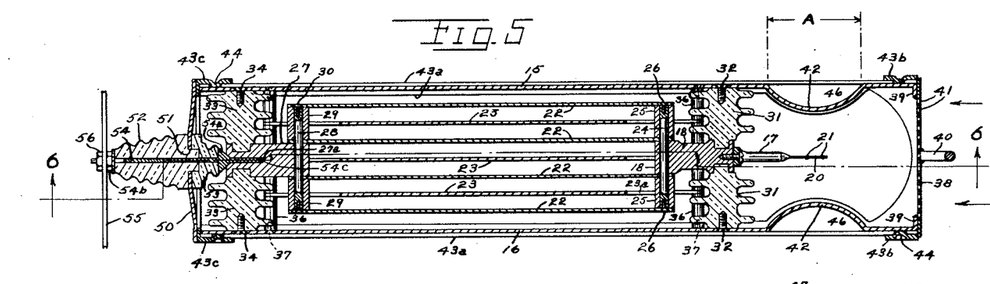
Fig. 5 is a sectional view taken along the line 5—5 of Fig. 4.
Figures 6, 13:
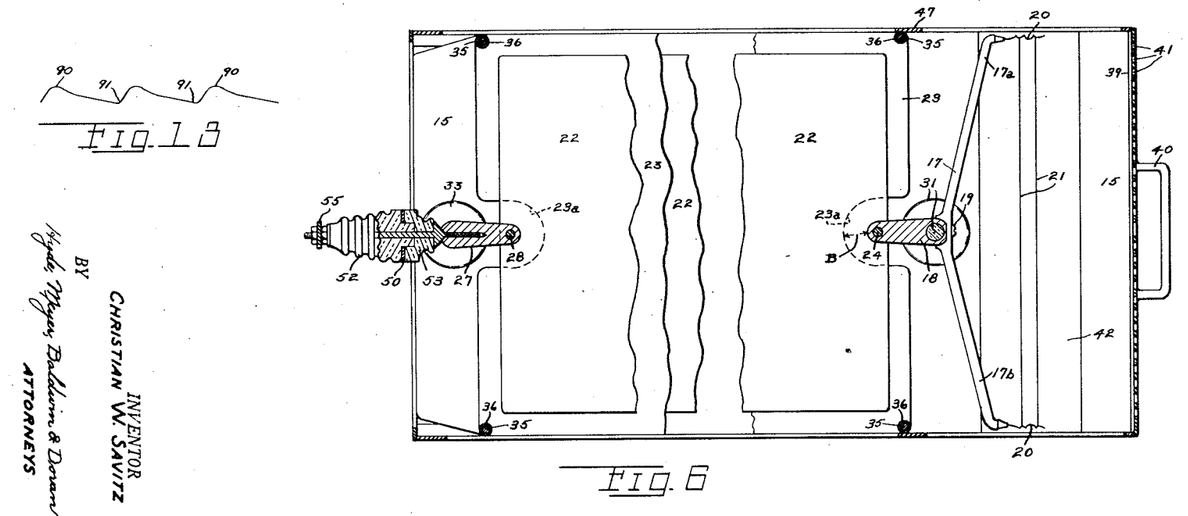
Fig. 6 is a sectional view taken along the line 6—6 of Fig. 5.
Fig. 13 shows a typical curve of the voltage across the cell.

Referring to Figs. 5 and 6, the cell comprises generally parallel side plates 15 and 16 which are also grounded collecting plates. The air flow through this cell is in the direction of the arrows of Fig. 5. At the upstream end of the cell there is an ionizing unit comprising an electrode supporting arm 17 having its mid portion rigidly secured to an electrically conducting bracket 18 by means of screw 19. The arm 17 diverges forwardly and outwardly in both directions from the bracket 18 to provide the arms 17a and 17b which terminate in stiff electrode supports 20. These electrode supports preferably have spring characteristics so that they exert a tension effect upon the two ionizing wires 21 which are suspended between them. Preferably the electrode supports 20 have notches for positioning the ionizing wires generally parallel and spaced apart in the present instance about one-half inch for a purpose which will presently appear. Current is supplied to the ionizing wires through the arm 17 and the bracket 18 through a series of hot or positively charged collector plates 22 which are positioned between grounded collector plates 23. As clearly shown in Figs. 5 and 9, there are five grounded collector plates including the side plates 15 and 16 and four hot collector plates 22 positioned between them. The average spacing between these plates is one-half inch and the eight spacings between the nine plates add up to approximately four inches for the total width of the cell. The hot plates are suspended at the front end of the cell by means of a bar 24 which passes through a suitable opening in the bracket 18 and through suitable openings in the hot plates, these latter being properly spaced by the bracket 18 and by sleeves 25. Screws 26 in the ends of the bar 24 hold these parts assembled. At the rear end of the cell there is a similar construction including the bracket 27, the bar 28, the spacing sleeves 29 and the screws 30. In each instance, the bracket 18 and 27 is insulated from the side plates 15 and 16. At the front end of the cell the insulators 31 engage holding recesses in bracket 18 at one end and at the opposite end are secured by screws 32 to the side plates 15 and 16. At the rear end of the cell the construction is similar where the insulators 33 enter recesses in the bracket 27 and are secured to the side plates by screws 34. The grounded plates are secured to each other and to the side walls by long bars 35 passing through suitable openings at the four corners of the plates 23 and registering openings in the plates 15 and 16. Spacer sleeves 36 on these bars hold the plates in their proper positions and the assemblies are held together by screws 37 which pass through the plates 15 and 16 into the bars 35. The bars and spacers 35 and 36 and the insulators 31 and 33 with their fastening means provide stiffeners to hold the side plates 15 and 16 in their proper positions and to strengthen the entire cell.

At the upstream end of the cell a perforated plate 38 is secured by welding or rivets to flanges 39 on the side plates 15 and 16. To the forward face of this plate there is secured a handle 40. The plate thus serves several purposes. First, it firmly secures the side plates 15 and 16 together in a rigid manner and holds the cell in square or rectangular form. At the same time it serves as a mounting for the handle 40 so that the cell is easily lifted in and out of its position or otherwise handled as necessary. In the third place, a plurality of evenly spaced perforations 41 over the entire face of the plate 38 serves to equalize gaseous stream flow through the cell.

One of the advantages of my invention over similar electrostatic filters of the prior art is that I only supply high voltage of one voltage level for the operation of the ionizing portion of the cell and of the collecting portion of the cell. The most efficient devices on the market today utilize a higher ionizing voltage than is used in the collector cell. There are several reasons I am able to do this and still obtain efficient dust precipitation as will presently appear. One of the reasons is that I use a different spacing between the positively and negatively charged plates of the collector cell than is used in the ionizing portion of my device. Referring to Fig. 5, and also to Fig. 9, it will be seen that the positively charged ionizing electrode wires 21 are spaced apart in a plane extending in the general direction of stream flow and opposite these positively charged electrodes are the negatively grounded electrodes 42. Each of these electrodes 42 is brought into a point about one and three-eighth inches from the plane passing through the wires 21. Each of these electrodes 42 is a partial cylindrical surface generated by a line moving parallel to the wires 21 so as to generate an air foil surface for a purpose which will presently appear. In the present instance, each of the surfaces 42 is formed about a radius of approximately two and one-sixteenth inches and the total dimension A of Fig. 5 is approximately two and seven-eighth inches. It results from this construction that the air or other gaseous stream passing through the cell has laminar flow which hugs the surface 42 and comes close against the side plates 15 and 16 directly downstream from the electrodes 42. I thus have an even distribution of the gaseous stream at this point and an even collection on the side plates 15 and 16 and the plates adjacent to them. It will be readily realized that if any turbulence were caused in the gaseous stream by the electrodes 42, I would not be enabled to extend the collecting cell to the width indicated between the plates 15 and 16, or if I did so, there would not be efficient collection. By having the air foil surfaces 42, I get good air flow clear out to the side plates 15 and 16 with even distribution and good collection. The insulators 31 and 33 are streamlined as much as possible and they interfere very little with the even flow of the gaseous stream.

It is not necessary for the successful operation of my device for the electrodes 42 to be formed integrally or even connected with the side plates 15 and 16. I have formed them in this manner however to make a cheap, simple and efficient cell and one which is of very strong construction. If the electrodes 42 were not mechanically connected to the side plates 15 and 16, the air flow would still have the same characteristics. If the electrodes 42 were not electrically connected to the side plates 15 and 16, they might be separately grounded and obtain the same electrical characteristics.

Referring to Fig. 6, it will be noted that the hot plates 22 are slightly shorter and slightly narrower than the grounded plates 23. In one form of my device, the grounded plates 23 have a margin of about three-quarters of an inch all around the hot plates 22. The grounded plates 23 are recessed as indicated at 23a so as to hold them at a safe electrical distance away from the hot brackets 18 and 27. The distance B, Fig. 6, is approximately one inch.

Figures 7, 8, 9:
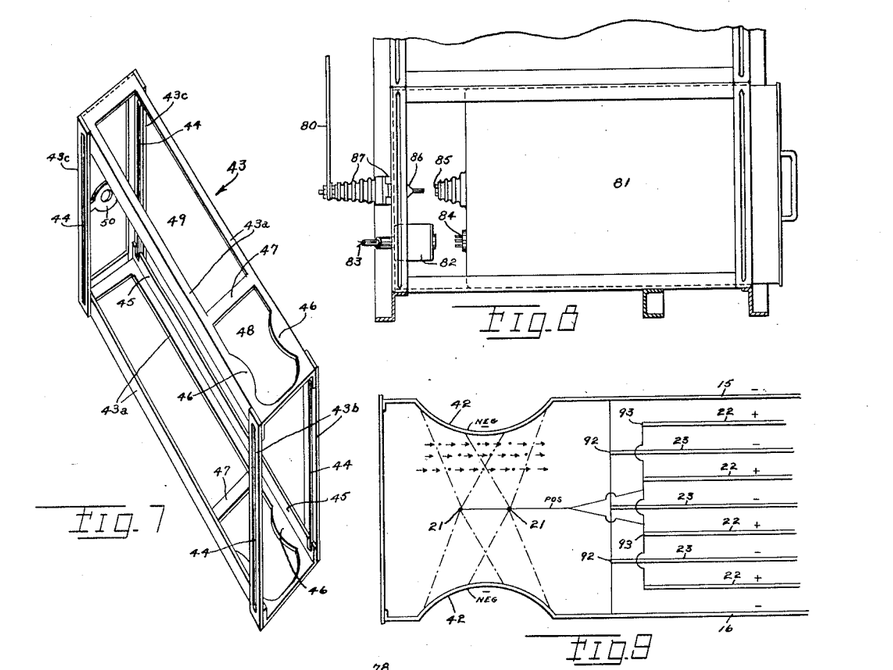
Fig. 7 is a perspective view of a frame adapted to hold a single filter cell.
Fig. 8 is a side elevational view of a power pack adapted to be used to energize our electrostatic filter, the pack itself being just out of contact with the electrical connections for supplying current to and taking power from the power pack.
Fig. 9 is a view similar to the upper portion of Fig. 5 but diagrammatic in form to explain the ionization and collection of particles in the gaseous stream.

Each cell is adapted to be slid into and out of a holding frame such as that shown at 43 in Fig. 7. This frame is generally rectangular and comprises four generally parallel longitudinally extending angle members 43a which are rigidly connected together by two parallel vertical members 43b at the front end and two parallel vertically extending members 43c at the rear end. The longitudinally extending members 43a engage the top and bottom edges of the side plates 15 and 16 to guide the same into position. The two bottom members 43a provide horizontally extending ways upon which the cell slides. The upright members 43b and 43c are preferably so formed that they smoothly engage the outside flat faces of the plates 15 and 16. In the constructions shown, a strengthening rib shown at 44 extends inwardly from each of the vertical members 43b and 43c so as to lie flush with the inner faces 45 of the angle members 43a so that along the entire outside face of the plates 15 and 16 there is an approximate seal at this point. The upper and lower pairs of longitudinally extending members 43a are closed by a structure at the front end comprising lenticular walls 46 which close the top and bottom ends of the lenticular form electrodes 42. A cross bar 47 provides a strengthening member and a partition wall directly across the top of the assembled members 35 and 36 which hold the grounded collector plates together. This cooperates with another partition member to be later described in order to cause the proper flow through the unit. This construction provides an opening at 48 near the front end of the filter cell for the inspection and maintenance of the ionizing electrodes 21 and for air insulation adjacent the ends of the ionizing electrodes. It also provides an opening 49 above the collector plates so that they are accessible for inspection even while the cell is within the frame.

The manner of energizing the filter cell is clearly shown in Figs. 5, 6, and 7. Across the rear upright member 43c of the frame is rigidly secured a strap 50. Through the center of this strap there is provided an opening 51 (Fig. 5) through which extends a portion of the rearwardly extending insulator 52. A forwardly extending insulator 53 has a recess for receiving the end of the insulator 52 so that they nest together and embrace the strap 50 between them. A metallic conductor 54 extends through the insulators to connect them together. For this purpose it is provided at its inner end with a head 54a, and at its outer end with a nut 54b which is threaded on the stem 54. The conductor 54 extends through an opening in a bus bar 55 and is secured thereto by a nut 56 threaded on the end of the bar 54. The innermost end of the electrically conducting bar 54 is split as indicated at 54c to make a good contact with a recess 27a in the end of the bracket 29 adapted to receive the electrical connection. It results from this construction that when high tension current is fed through the bus bar 55 it passes through the electrical conducting bar 54 to the bracket 27 and then through the parts electrically associated with this bracket, through the hot plates 22 to the forward end of the cell where it is conducted through the bracket 18 and the arm 17 to the ionizing electrodes 21.

Figure 10:
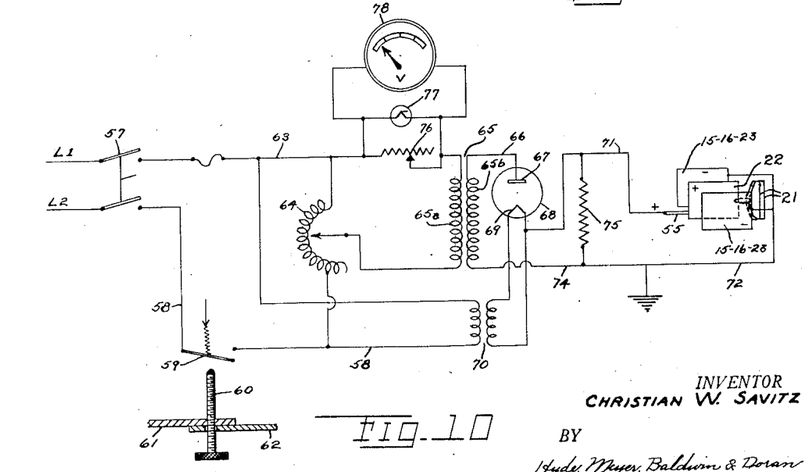
Fig. 10 is a diagram of an electric circuit for operating our electrostatic filter.

One form of power pack for energizing my electrostatic cell is shown diagrammatically in Fig. 10. Here low tension alternating current is supplied through the lines $L_1$, $L_2$ through a main switch 57. One side of the line connected through line 58 leads to safety switch 59 which is normally urged in opening direction and is held closed by a screw 60 having a large number of fine threads and threaded through a portion of the duct work 61 so as to hold the door 62 closed. The length of time necessary to remove the screw 60 so as to open the door 62 is sufficient to deenergize the electrostatic cell as will presently appear. Connected across the two main lines 58 and 63 is a variable auto transformer 64 of known type. This is for varying the current supplied to the primary winding 65a of the high tension transformer 65. The secondary winding of this transformer 65b is connected at one end through line 66 to the plate 67 of a rectifier tube 68. The filament 69 of this rectifier tube is supplied with current through a transformer 70, the primary of which is also connected across the main lines 58 and 63. Current from the rectifier tube is led through line 71 to bus bar 55 through which it is connected to one or more plates 22 of the electrostatic filter cell. The alternate plates 15, 16 and 23 of the filter cell are shown grounded through line 72. In actual practice, this ground is the casing 73 which surrounds one or more filter cells. One end of the transformer winding 65b is also grounded through line 74. A very high resistance 75 is connected from line 71 to ground, and this provides a leak resistance for leaking off the charge on the electrostatic cell after switch 59 is opened and while screw 60 is being removed. A variable resistance 76 is provided in the line leading to the primary winding 65a. An indicator lamp 77 is shunted across this resistance. A volt meter 78 is connected to indicate the voltage. In actual practice, the known normal current consumption of one or more filter cells connected as shown in the diagram of Fig. 10 is known. With switches 59 and 57 closed, the auto transformer 64 is set until an ammeter in the line 71 leading to the filter cells reads the normal current consumption for operation of the filter cells. The resistance 76 is then adjusted until the lamp 77, a six volt lamp, just glows.

Figure 1:
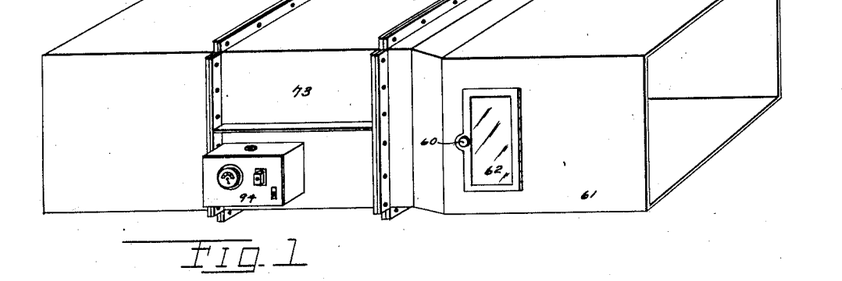
Fig. 1 is a perspective view of an air duct in which our electrostatic equipment has been incorporated.

In Figs. 1 to 4, I have shown a plurality of cells assembled together in the casing 73 which in turn may be bolted into duct work as indicated in Fig. 1. Within this casing 73 a frame work is provided for each cell quite similar to the frame work shown in Fig. 7. Each cell when pushed into position engages an electrically conducting plug similar to 52, 53, 54 at the rear end of the frame work. These plugs are indicated at 79 in Fig. 3. They are all connected together by a bus bar 80. Preferably, but not necessarily, in a construction of this sort one of the cells may be replaced by a special power pack indicated at 81 containing the equipment shown diagrammatically in Fig. 10. The low tension current for lines 59 and 63 is supplied through a receptacle 82 mounted on the frame and connected through lines 83 with a source of low tension current. A plug 84 mounted on the power pack 81 engages the receptacle 82 automatically when the power pack is shoved clear into its innermost position. The high tension current indicated at line 71 in Fig. 10 is supplied to an insulated socket 85 which in turn connects with a conducting plug 86 which in turn is connected to the bus bar 80. Suitable insulators are provided at 87 as will be clearly understood.

Figure 2:
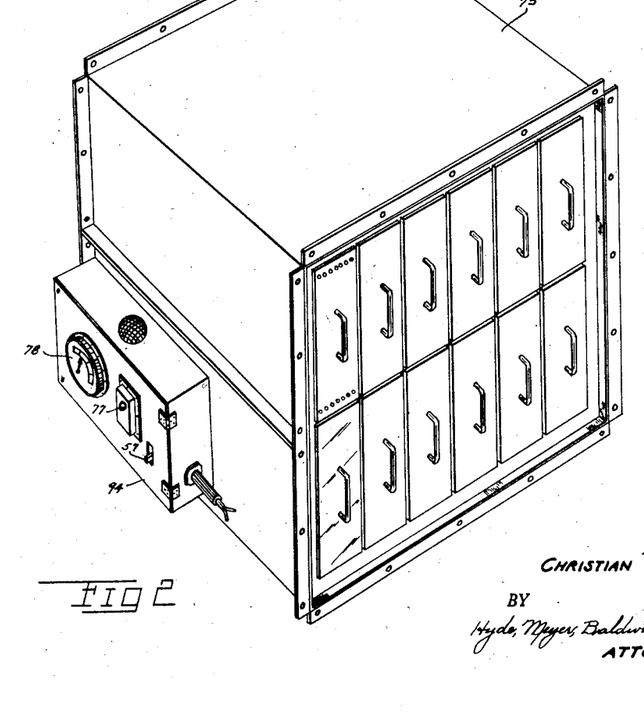
Fig. 2 is a perspective view of the electrostatic filter portion of Fig. 1 removed from the duct and viewed in perspective so as to show the front ends of a plurality of filter cells.
Figure 3:
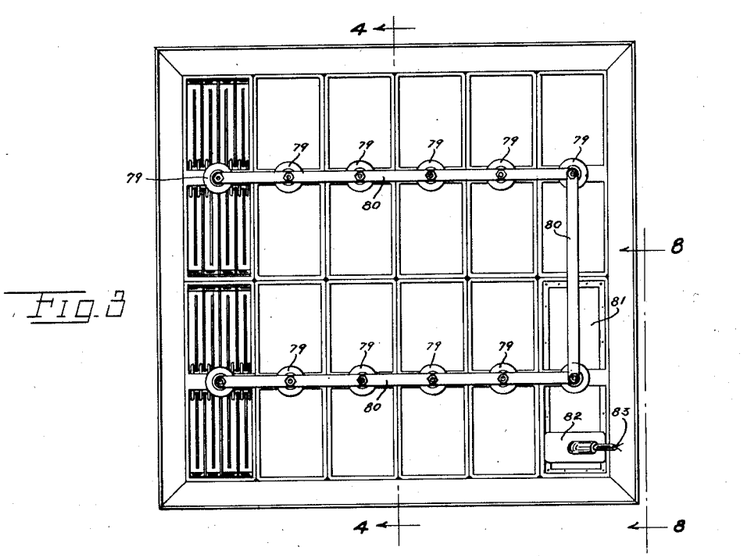
Fig. 3 is a rear elevational view of the unit of Fig. 2.

It will be realized that when a plurality of cells are connected together as shown in Figs. 1 to 4 inclusive, little or no clearance is needed between the outermost plates 15 and 16 of the various cells and the duct work because the plates 15 and 16 are grounded as is the duct work. However, at the top and bottom of the filter a little different condition exists. Fire Underwriters' rules calls for a minimum distance between the hot plates 22 of the uppermost or lowermost cell and the surrounding duct work, the line of which is indicated at 88 in Fig. 4. Between this duct work and the adjacent filter cell, I provide a baffle or partition 89 which in each base lies opposite the division bar 47 of the frame work previously mentioned. This prevents the gaseous stream being filtered bypassing around the top or bottom of the upper and lowermost filter cells. Obviously, no division wall is necessary between two cells which are adjacent as indicated in Fig. 3 either side-by-side or up and down.

Referring to Fig. 9, I will now explain the spacing of the parallel ionizing electrodes 21. In the first place, it should be understood that the alternating current supplied in the winding 65a and transformed in the winding 65b of the high tension transformer is partially but not entirely smoothed by means of the rectifier tube 68 and the capacitance represented by the collection plates 22, 23, 15 and 16 of the filter cell. Actually the voltage curve will be somewhat as that shown in Fig. 13. It results from this construction that the intensity of the electrostatic field existing between one of the ionizing wires 21 and one of the grounded electrodes 42 will vary from time to time in tune with the frequency of the low tension current supplied to the winding 65a of the high tension transformer. If a particle in the air stream should be passing an electrode 21 when the voltage curve was at or near one of the peaks 90 indicated in Fig. 13, it would stand a very good chance of being charged. If, however, it should pass that same electrode when the voltage curve was at a low point 91 then it would stand a poorer chance of being charged. I therefore arrange the spacing of the two parallel electrodes 21 so that if a particle misses the peak voltage on one of the wires 21, then it will be near a point of peak voltage when it passes the other wire 21. I prefer, therefore, to make this spacing S equal V (the velocity of the air stream) divided by 10F where F is the frequency of the low voltage current supplied to the winding 65a of the high tension transformer. This equation has been arranged so that S is in inches when V is expressed in feet per minute and the frequency F is in cycles per second. In other words, when the equipment is designed for three hundred feet per minute and the frequency is 60, then the spacing is equal to three hundred divided by ten times sixty, or one-half, and I therefore space the electrodes 21 one-half inch apart in this form of my invention. Again referring to Fig. 9, I have indicated by dot-dash lines how the ionizing effect from each of the wires 21 spreads outwardly toward the grounded electrode 42 and these two zones overlap each other as indicated. It should be noted also in Fig. 9 that the nearest edge of a grounded collector plate 23 as indicated at 92 is farther from the ionizing wire 21 than the grounded electrode 42. This space is about six times the spacing of the collector plates in the present embodiment. This insures a good field between 21 and 42 and practically no field between 21 and 92. I have found that with the forwardmost edge 93 of the hot plates 22 spaced backwardly from the leading edge 92 of the grounded plates, I obtain higher efficiency than otherwise. I have tried the hot plates in front of and spaced opposite the forward ends of the grounded plates, but these do not give as good efficiency as the position shown in Fig. 9. This gives a greater distance between the point 93 and point 92 than directly across between the plates and holds down the back corona discharge.

In one form of my invention, I have used an electrode 21 which is four thousandths of an inch in diameter and an electrode 42 which is an arc on the circumference of a circle four and one-eighth inches in diameter. The high ratio between these diameters gives a high ratio of ionization voltage to peak voltage and a low ratio between corona voltage and spark over voltage.

I find that my electrostatic filter is very low in current consumption and takes about twenty micro amps per hundred cubic feet of air handled per minute at about eighty-five hundred to nine thousand volts high tension current. This gives a very low production of ozone and nitrous oxide which is a desirable feature.

Figure 4:
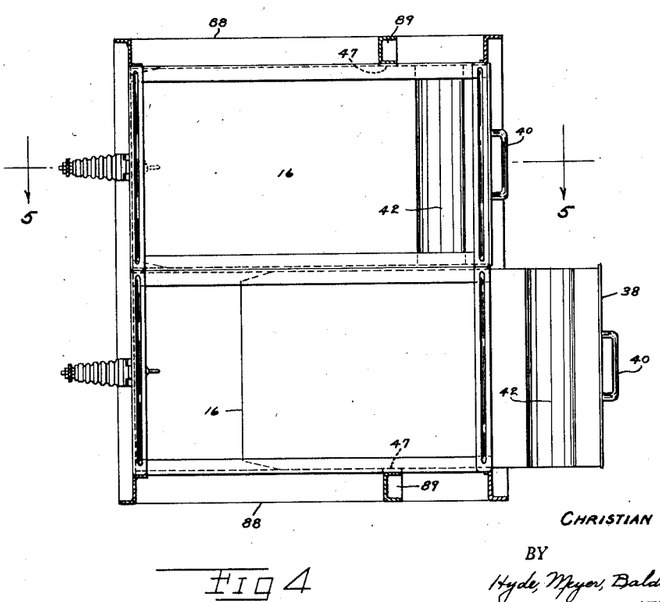
Fig. 4 is a sectional view taken along the line 4—4 of Fig. 3.

I have shown the device as described in connection with Figs. 2, 3, and 4 as mounted in the duct work in Fig. 1 with a box 54 on the outside of the housing in which are located the volt meter 76, the indicator light 77, the main switch 57 and the variable auto transformer 64. The rest of the equipment of Fig. 10 is housed in the power pack 81.

I find that the device just described has a high efficiency when operating at about ninety-five hundred volts and with both wires 21 in good condition, at which time the efficiency on atmospheric dust will be about ninety-five to ninety-seven per cent. If one of the wires 21 should become broken, then the device will lose about five per cent in efficiency so long as the other wire is in working condition.

Figure 11:
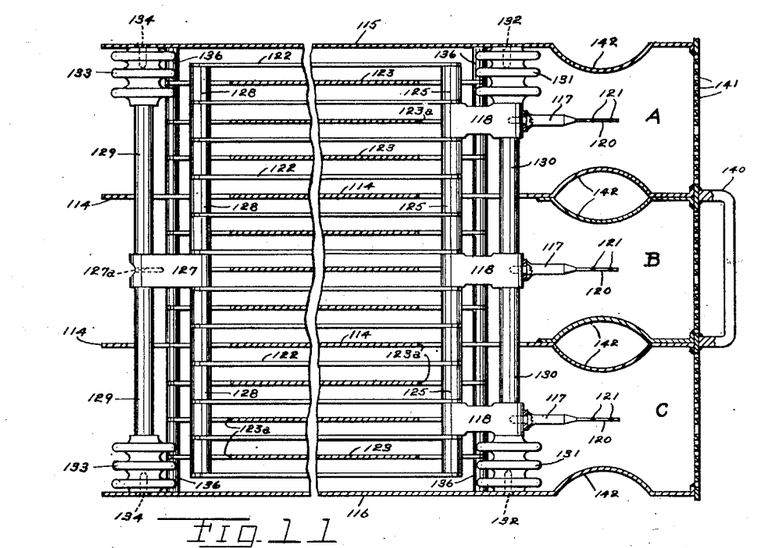
Fig. 11 is a sectional view through a modified form taken in a position similar to Fig. 5.

In Fig. 11, I have shown how I may combine the device thus far described into a larger unit other than as previously shown in connection with Figs. 2 and 3. In Fig. 11, I have shown thirteen grounded plates including side plates 115 and 116, other plates 123 similar in all respects to plates 23 previously described and certain other plates 114 which are slightly different in that they carry some grounded electrodes in the ionizing chambers. Twelve hot collector plates 122 are positioned alternately between the grounded plates and these are quite similar to plates 22 previously described. This large cell of Fig. 11 is divided into three ionizing cells A, B and C. In each cell a pair of positively charged ionizing wires 121 are provided connected with a power pack in the manner of the ionizing wires 21 previously described. These are mounted on arms 117 and carried by electrode holders 120 in exactly the manner of the ionizing wires described in connection with Figs. 5 and 6. Grounded electrodes 142 are carried by the plates 114, 115 and 116 as shown so as to provide lenticular grounded electrodes opposite each pair of hot electrodes 121. The hot collector plates are mounted at the front end on a bar 125 which is a combination of a central bar and spacers as described in connection with 24 and 25 in my previously described form. The assembly 125 is mounted on three brackets 118 which are in all respects like the bracket 18 previously described, and this bracket in each case carries one of the arms 117. A bar 130 carries all three of the brackets 118 and is insulated at each side of the cell by means of insulators 131 which are held in plates 115 and 116 by screws 132. At the rear end of the hot plates, they are assembled on a combination of bar and spacers 128 similar to that described at 28 and 29 in the first described form. This bar and spacer unit is supported at the central part thereof by means of a bracket 127 exactly like the bracket 27 previously described. This has a pocket 127a to receive a high tension plug 54 for electrification in the same manner as the single cell form first described. The bracket 127 is mounted on a bar 129 which in turn is supported by insulators 133 which are held in the side plates by means of screws 134. The grounded plates are supported at their four corners by structure indicated at 136 which is a combination of a bar and spacers as shown in the first described form, and these in turn are connected by suitable screws to the side plates 115 and 116. Here again, the grounded plates are cut away as indicated at 123a so as to keep them a safe electrical distance from the hot portions of the device. A perforated plate 141 may be provided across the upstream end of each cell so as to strengthen and protect the unit and at the same time to provide equal distribution of air entering the cell. A handle 140 is provided for lifting the cell.

Figure 12:
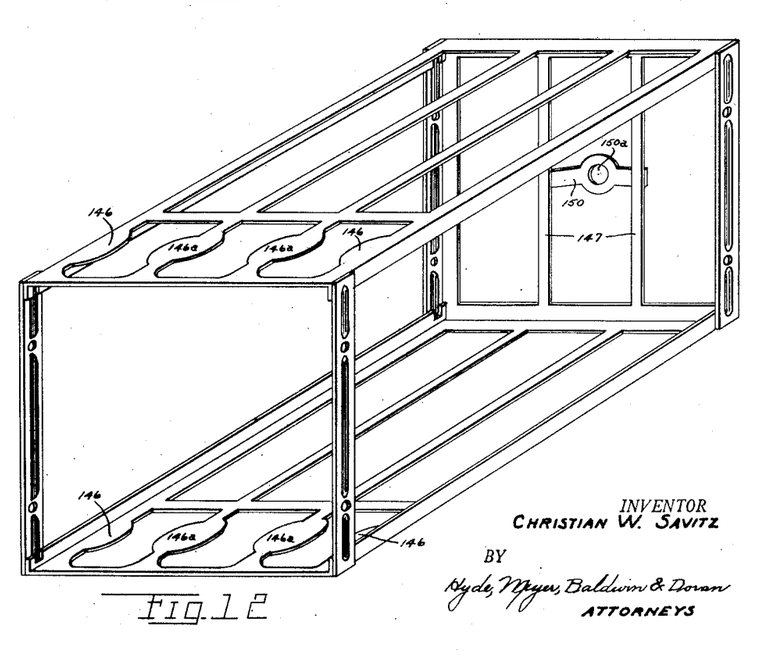
Fig. 12 is a perspective view of a frame to receive the filter cell of Fig. 11.

The frame into which the cell of Fig. 11 fits is shown in Fig. 12. The construction here is quite similar to that described in connection with Fig. 7, and it is necessary to merely state the difference. The portions 146 at the top and bottom of the frame close the side electrodes 142 and the portions 146a at the two central locations cover the openings where the two lenticular electrodes bend away in opposite directions. Since only one energizing plug is necessary, one strap 150 is connected between the two vertical frame members 147 in the central rear part of the cell, and an energization plug is mounted in the opening 150a in this strap. It is obvious that I might combine a lesser or greater number of plates in a device similar to Fig. 11.

What I claim is:

1. An electrostatic precipitator comprising electrically charged means for collecting ionized particles, means for compelling a gaseous stream flow over said collecting means, ionizing means upstream from said collecting means and comprising two generally parallel ionizing electrodes in a plane parallel to the general direction of stream flow, opposed electrodes, spaced from and generally parallel to said ionizing electrodes, means common to said ionizing electrodes for supplying electricity of one sign thereto and of opposite sign on said opposed electrodes, said last named means including a transformer having a primary winding supplied by alternating current of predetermined frequency and including rectifying means for the output of said transformer, and the spacing of said ionizing electrodes in inches being approximately equal to $V \div 10f$ where V equals the velocity of the stream in feet per minute and $f$ equals the frequency in said primary winding in cycles per second.

2. The combination of claim 1 wherein said opposed electrodes are part-cylindrical in form on each side of said plane and with convex faces toward said plane.

3. The combination of claim 1 wherein said opposed electrodes are of part-cylindrical form generated by a line moving parallel to said ionizing electrodes, one part-cylindrical form electrode being positioned on each side of said plane through said ionizing electrodes with their convex faces toward said plane, and each part-cylindrical form electrode being wider in the direction of stream flow than the distance between said parallel ionizing electrodes.

4. An electrostatic precipitator cell comprising a plurality of parallel plates, a frame for holding said cell in a fluid stream, said cell being slidable in said frame in the general direction of fluid flow from an inoperative position to an operative position, an electrical contact carried by said cell and electrically connected with alternate ones of said parallel plates, an electrical contact carried by said frame and registering with and engageable by said first named contact when said cell is slid into operative position, and an ionizing electrode wire carried by said plates upstream thereof, said ionizing electrode wire electrically connected with said alternate ones of said plates.

5. An electrostatic precipitator cell comprising a plurality of parallel plates, a frame for holding said cell in a fluid stream, said cell being slidable in said frame in the general direction of fluid flow from an inoperative position to an operative position, an electrical contact carried by said cell and electrically connected with alternate ones of said parallel plates, an electrical contact carried by said frame and registering with and engageable by said first named contact when said cell is slid into operative position, said plates having upstream edges generally at right angles to the general direction of stream flow, and an ionizing electrode wire carried by said plates upstream thereof and parallel to said upstream edges of said plates, said ionizing electrode wire electrically connected with said alternate ones of said plates.

6. The combination of claim 5 wherein other of said parallel plates extend upstream from said upstream edges of said alternate plates sufficiently to prevent back ionization.

7. The combination of claim 5 wherein said parallel plates are substantially evenly spaced, and other of said parallel plates extend upstream from said upstream edges of said alternate plates approximately one and one-half times said parallel plate spacing.

8. The combination of claim 5, wherein said parallel plates are substantially evenly spaced, other of said parallel plates extend upstream from said upstream edges of said alternate plates approximately one and one-half times said parallel plate spacing, and said ionizing electrode wire being upstream from said other plates approximately six times said parallel plate spacing.

9. An electrostatic precipitator cell comprising a plurality of laterally-spaced parallel plates, the two outermost of said plates being longer than the rest of said plates, means connecting said outermost plates with alternate plates to form a first set, means connecting the others of said plates to form a second set, means insulatingly supporting said second set of plates upon said first set of plates, a bracket carried by said second set of plates in electrical connection therewith, an ionizing electrode carried by said bracket between said outermost plates and spaced from the rest of said plates, and an electrical plug contact carried by said second set of plates at the end thereof opposite said bracket.

10. An electrostatic precipitator cell comprising a plurality of laterally-spaced parallel plates, the two outermost of said plates being longer than the rest of said plates, means connecting said outermost plates with alternate plates to form a first set, means connecting the others of said plates to form a second set, means insulatingly supporting said second set of plates upon said first set of plates, a bracket carried by said second set of plates, an ionizing electrode carried by said bracket between and parallel to said outermost plates and spaced from the rest of said plates, and a portion of each of said outermost plates being bent inwardly opposite said electrode, the number of plates in said second set being greater than the number of said ionizing electrodes.

11. An electrostatic precipitator cell comprising a plurality of laterally-spaced parallel plates, the two outermost of said plates being longer than the rest of said plates, means connecting said outermost plates with alternate plates to form a first set, means connecting the others of said plates to form a second set, a bracket carried by said second set of plates, an ionizing electrode carried by said bracket between and parallel to said outermost plates and spaced from the rest of said plates, a portion of each of said outermost plates being bent inwardly opposite said electrode in air foil form generated by a line moving parallel to said ionizing electrode, and at least one of said second set of plates being nearer the plane of one of said outermost plates than the innermost portion of said air foil form.

12. An electrostatic precipitator cell comprising a plurality of laterally-spaced parallel plates, the two outermost of said plates being longer than the rest of said plates, means connecting said outermost plates with alternate plates to form a first set, means for electrically grounding said first set of plates, means connecting the others of said plates to form a second set, means insulatingly supporting said second set of plates upon said first set of plates, a frame for holding said cell in a fluid stream said frame having horizontally extending ways upon which said cell may slide, said outer plates being slidable in said frame on said ways in the general direction of fluid flow from an inoperative position to an operative position, an electrical contact carried by and electrically connected with said second set of plates, and an electrical contact carried by said frame and registering with and engageable by said first named contact when said cell is slid into operative position.

13. An electrostatic precipitator cell comprising a plurality of laterally-spaced parallel plates, the two outermost of said plates being longer than the rest of said plates, means connecting said outermost plates with alternate plates to form a first set, means connecting the others of said plates to form a second set, a frame for holding said cell in a fluid stream, said outer plates being slidable in said frame in the general direction of fluid flow from an inoperative position to an operative position, an electrical contact carried by and electrically connected with said second set of plates, an electrical contact carried by said frame and registering with and engageable by said first named contact when said cell is slid into operative position, a bracket carried by said second set of plates at the end thereof opposite said first named contact, and an ionizing electrode carried by said bracket between said outermost plates and spaced from the rest of said plates.

14. A unitary electrostatic precipitator cell consisting of a plurality of laterally-spaced parallel plates, the two outermost of said plates being longer than the rest of said plates, means connecting said outermost plates with alternate plates to form a first set, means connecting the others of said plates to form a second set, means insulatingly supporting said second set of plates upon said first set of plates, all of said plates except the outermost having upstream edges at right angles to the general direction of stream flow, said outermost plates having portions extending upstream from said upstream edges, a bracket carried by said second set of plates at the upstream end thereof, an ionizing electrode substantially parallel to said upstream edges of said plates and carried by said bracket between said extending portions of said outermost plates, said outermost plates being bent inwardly opposite said electrode, and an electrical contact carried by said second set of plates at the downstream end thereof.

15. The combination of claim 13 including a foraminous plate rigidly connected between said outermost plates and extending over the entire upstream end of said cell for adding rigidly to the cell and for evenly distributing fluid flow into said cell.

16. The combination of claim 13 including a foraminous plate rigidly connected between said outermost plates and extending over the entire upstream end of said cell for adding rigidity to the cell and for evenly distributing fluid flow into said cell, and a handle secured to said plate for moving said cell into and out of said frame.

17. An electrostatic precipitator cell comprising a plurality of laterally-spaced parallel plates, the two outermost of said plates being longer than the rest of said plates, means connecting said outermost plates with alternate plates to form a first set, means connecting the others of said plates to form a second set, all of said plates except the outermost having upstream edges at right angles to the general direction of stream flow, said outermost plates having portions extending upstream from said upstream edges, a bracket carried by said second set of plates at the upstream end thereof, an ionizing electrode carried by said bracket between said extending portions of said outermost plates, said outermost plates being bent inwardly opposite said electrode, an electrical contact carried by said second set of plates at the downstream end thereof, a frame for holding said cell in a fluid stream, said cell being slidable in said frame in the general directions of stream flow from an inoperative position to an operative position, an electrical contact carried by said frame and registering with and engageable by said contact at the downstream end of said second set of plates when said cell is slid into operative position, means for supplying high tension unidirectional current to said frame carried contact, and means for grounding said first set of plates.

18. In combination, a plurality of individual unitary electrostatic precipitator cells, each cell comprising a plurality of laterally-spaced parallel plates, the two outermost of said plates being longer than the rest of said plates, means connecting said outermost plates with alternate plates to form a first set, means connecting the others of said plates to form a second set, all of said plates except the outermost having upstream edges at right angles to the general direction of stream flow, said outermost plates having portions extending upstream from said upstream edges, a bracket carried by said second set of plates at the upstream end thereof, an ionizing electrode carried by said bracket between said extending portions of said outermost plates, said outermost plates being bent inwardly opposite said electrode, an electrical contact carried by said second set of plates at the downstream end thereof, a frame for holding said cells in a fluid stream, there being pockets in said frame, each cell being slidable in one of said pockets in the general direction of stream flow from an inoperative position to an operative position, electrical contacts carried by said frame, one contact registering with and engageable by said contact in each cell at the downstream end of its second set of plates when each cell is slid into operative position, another pocket in said frame, a power pack adapted to slide into and out of said other pocket, low tension and high tension electrical contacts carried by said frame and adapted to plug into said power pack when it is in said other pocket, and electrical connections from said high tension contact to said first named electrical contacts carried by said frame.

19. A unitary electrostatic precipitator cell consisting of a plurality of laterally-spaced parallel plates, the two outermost of said plates being longer than the rest of said plates, means connecting said outermost plates with alternate plates to form a first set, means connecting the others of said plates to form a second set, a bracket carried by said second set of plates, an ionizing electrode wire carried by said bracket between and parallel to said outermost plates and spaced from the rest of said plates, said ionizing electrode wire and said bracket being in electrical communication with said second set of plates, said means connecting said second set of plates comprising bolt and spacer means uniting said second set of plates, said bracket connected with said bolt and spacer means and extending longitudinally of said cell beyond the united plates, said brackets being spaced from said outermost plates, and electrical insulators connected between said bracket and said outermost plates.

20. The combination of claim 19 including an ionizing electrode wire support mounted on said bracket.

21. The combination of claim 20 wherein said support for said ionizing electrode wire has diverging arms extending up and down generally transversely of said cell, a short length of spring wire extending generally upstream from the end of each arm, and said electrode wire being held in tension between said spring wires.

22. The combination of claim 1 wherein said opposed electrodes are of a form generated by a line moving parallel to said ionizing electrodes, one of said opposed electrodes being positioned on each side of said plane through said ionizing electrodes with their faces bent inwardly toward said plane, and each of said opposed electrodes being wider in the direction of stream flow than the distance between said parallel ionizing electrodes.

23. An electrostatic precipitator cell comprising a plurality of laterally-spaced parallel plates, the two outermost of said plates being longer than the rest of said plates, means connecting said outermost plates with alternate plates to form a first set, means connecting the other of said plates to form a second set, means insulatingly supporting said second set of plates upon said first set of plates, a frame for holding said cell in a fluid stream, said outer plates being slidable in said frame in the general direction of fluid flow from an inoperative position to an operative position, an electrical contact carried by and electrically connected with said second set of plates, an electrical contact carried by said frame and registering with and engageable by said first named contact when said cell is slid into operative position, an ionizing electrode fixed in said cell parallel to the upstream ends of said plates and between the outermost of said plates and spaced from the rest of said plates, and an electrical connection between said ionizing electrode and said second set of plates.

CHRISTIAN W. SAVITZ.

References Cited in the file of this patent

UNITED STATES PATENTS

| Number | Name | Date |
|---|---|---|
| 1,343,285 | Schmidt | June 15, 1920 |
| 2,215,298 | Pegg | Sept. 17, 1940 |
| 2,251,451 | Heinrich | Aug. 5, 1941 |
| 2,255,677 | Penney | Sept. 9, 1941 |
| 2,333,551 | Pegg | Nov. 2, 1943 |
| 2,359,149 | Pegg | Sept. 26, 1944 |
| 2,386,993 | Yungman | Aug. 7, 1945 |
| 2,427,740 | Pegg | Sept. 23, 1947 |
| 2,476,247 | McKenzie | July 12, 1949 |
| 2,486,520 | Dahlman | Nov. 1, 1949 |
| 2,488,712 | Dahlman | Nov. 22, 1949 |
| 2,500,572 | Richardson | Mar. 14, 1950 |
| 2,504,430 | Lincoln | Apr. 18, 1950 |